Jan. 12, 1954　　　C. E. DEARDORFF　　　2,665,552
LOAD RESPONSIVE PRESSURE REGULATING VALVE
Filed Dec. 29, 1952
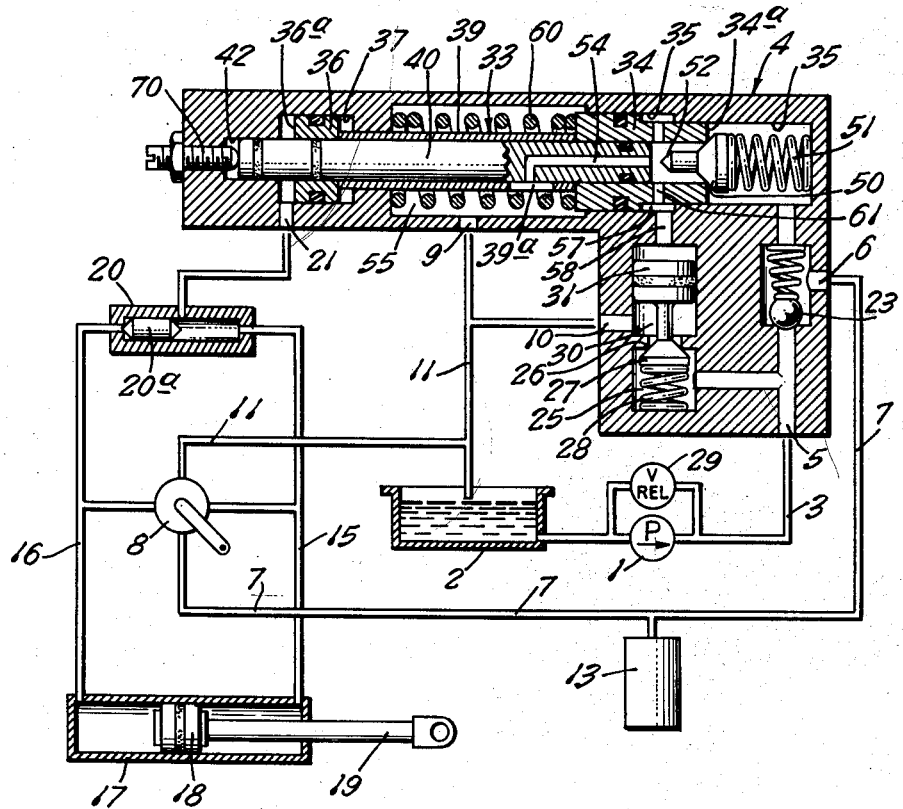
INVENTOR.
C. E. DEARDORFF
BY
ATTORNEY Patented Jan. 12, 1954

2,665,552

UNITED STATES PATENT OFFICE 2,665,552

LOAD RESPONSIVE PRESSURE REGULATING VALVE

Clinton E. Deardorff, San Fernando, Calif., assignor to Bendix Aviation Corporation, North Hollywood, Calif., a corporation of Delaware Application December 29, 1952, Serial No. 328,447

6 Claims. (Cl. 60—52)

1

This invention relates to pressure regulating or unloading valves for use with constantly running pumps to by-pass the pump output at low pressure when the motor load connected to the pump is not drawing fluid.

As heretofore constructed, unloading valves were designed to delver the pump output to the load line so long as the line pressure remained below a predetermined maximum value, and to by-pass the pump output to return when reduced consumption by the load caused the line pressure to exceed the predetermined value. The result was that during periods of light load, or no load, the pump maintained maximum pressure in the line whether such a high pressure was needed or not.

An object of the invention is to provide a system in which an unloading valve normally maintains a relatively low pressure in the line sufficient to satisfy ordinary pressure requirements of a load device but supplies a higher pressure when increased resistance of the load device requires it.

Another object is to provide a simple and practicable pressure regulating and unloading valve, the unloading pressure of which automatically varies with the requirements of the load.

Other more specific objects and features of the invention will become apparent from the description to follow.

Briefly, a complete system in accordance with the invention comprises a pump delivering fluid through a pump line and a pressure line and a selector valve to a load line leading to a device such as a motor, with an unloading valve connected between the pump line and the pressure line, and an auxiliary line between the load line and the unloading valve. The unloading valve contains a spring-loaded valve which is normally subjected only to the pressure in the pressure line, and opens to cause unloading of the pump when the pressure in the pressure line ahead of the selector valve reaches a predetermined value sufficient to overcome the spring, as in conventional unloading valves. However, when the selector valve is actuated to connect the pressure line to the load line, the load pressure is applied through the auxiliary connection to a pressure face on the spring loaded valve in aiding relation to the spring, so that a higher pressure line pressure is required to unload the pump.

Frequently the pressure required to move the load motor is relatively low, and its fluid-receiving capacity is greater than the pump capacity, so that the line pressure does not exceed the normal setting of the unloading valve. However, if the motor meets exceptional resistance, the unloading valve permits the pressure to rise above normal pressure to overcome the resistance and insure operation of the motor.

The overall result of the invention is that the system normally operates at a low pressure, which is economical of power and reduces wear, but is capable of developing greater pressure when it is required.

A complete understanding of the invention may be had from the following detailed description with reference to the drawing in which the single figure is a schematic diagram of a hydraulic system incorporating the present invention.

Referring to the drawing, the system therein disclosed comprises a pump 1 which receives fluid from a reservoir 2 and delivers it through a pump line 3 to an unloading valve 4 in accordance with the invention. The pump line 3 connects to a pump passage 5 in the unloading valve. The valve also has a pressure passage 6 connected by a pressure line 7 to a selector valve 8, and a pair of return passages 9 and 10 respectively which are connected by a return line 11 to the reservoir 2 and also to the selector valve 8. A hydraulic accumulator 13 may be connected to the pressure line 7. The selector valve 8, in addition to being connected to the pressure line 7 and the return line 11 is connected to a first load line 15 and a second load line 16, which lines extend to the opposite ends of a motor cylinder 17 having a piston 18 therein which may be connected as by a piston rod 19 to a load to be moved. One or the other of the load lines 15 and 16 is adapted to be connected by a switching valve 20 to a load passage 21 in the unloading valve 4. A pressure relief valve 29 is desirably connected across the pump 1 to relieve excessive pressures that may be developed in the pump line 3.

The unloading valve 4 contains a check valve 23 connecting the passages 5 and 6 and permitting flow from the pump passage 5 to the pressure passage 6 but preventing reverse flow. The passage 5 is also connected to a chamber 25 connected by a valve seat 26 to the return passage 10. This valve seat 26 is normally closed by a poppet 27 within the chamber 25, the poppet being urged into closed position by a spring 28. The poppet 27 is connected by a stem extending through the valve seat 26 to a piston 31 reciprocable in a cylinder 30, the lower end of which is connected to the return passage 10. To unload the pump, pressure is applied to the upper end of the piston 31, in a manner to be described later, to move the poppet 27 away from its seat and permit free flow of fluid from the pump passage 5 to the return passage 10.

The upper end of the cylinder 30 is connected either to the pressure passage 6 or to the return passage 9 by a valve mechanism controlled by the movements of a piston means 33. This piston means comprises a first piston 34 reciprocable in a first cylinder 35, and a second piston 36 reciprocable in a second cylinder 37 which is spaced from but coaxial with the cylinder 35. The two pistons 34 and 36 are maintained in spaced relationship with respect to each other by a sleeve 39 which is interposed between them. The pistons and the sleeve have bores of the same diameter and coaxial and there is positioned within these bores a stationary mandrel 40. The left end of the mandrel extends beyond the cylinder 37 and into a bore 42 in the casing.

The outer or right end of the bore in the first piston 34 defines a valve seat cooperating with a poppet 50 which is urged against the piston by a spring 51. Formed integrally with the poppet 50 is a smaller poppet 52 which is adapted to engage with and close the right end of a passage 54 in the mandrel 40, the left end of which passage communicates with a chamber 55 which is connected to the return passage 9. The sleeve 39 is provided with a slot 39a which permits free communication between the passage 54 in the mandrel and the chamber 55.

The first piston 34 and the cylinder 35 are stepped to define therebetween an annular passage 57 which is communicated by a passage 58 with the upper end of the cylinder 30.

The system described functions as follows:

Assume that the pump 1 is running and the selector valve 8 is in neutral position in which the pressure line 7, the return line 11, and the load lines 15 and 16 are all isolated from each other. The pump 1 therefore develops pressure in the pump line 3 and in the pressure line 7. This pressure is applied to the right end of the cylinder 35 and acts against the annular face 34a of piston 34 in opposition to the force of a spring 60 in the chamber 55 which urges the piston 34 to the right. Initially the piston 31 is in upper position in which the poppet 27 is closed, because the upper end of cylinder 30 is connected through the passage 58, the annular space 57, ports 61 in the piston 34 and the passage 54 to return. As the pressure builds up in the right end of cylinder 35, it first moves the poppet 50 and the first piston 34 to the left as a unit until the small poppet 52 seats against the right end of the mandrel 40 thereby limiting further leftward movement of the poppet 50. A further rise in pressure against the face 34a moves the first piston 34 further to the left thereby opening the poppet 50 away from the right end of the bore in the piston and permitting pressure fluid to flow through the passage 61, and the passages 57 and 58 to the upper end of the cylinder 30, forcing the piston 31 down to open the poppet 27, thereby permitting free discharge of fluid from the pump passage 5 to the return passage 10. However pressure is maintained in the pressure line 7 because of the check valve 23.

It will be apparent that, under the conditions described, the valve functions to limit the pressure in the pressure line 7 to a definite value dependent upon the strength of the spring 60 and the area of the piston face 34a. Some adjustment of this pressure can be had by varying the distance through which the poppet 50 has to move before the poppet 52 engages the right end of the mandrel 40. This is done by shifting the leftward limit of the mandrel 40 which is determined by an adjusting screw 70.

Now let it be assumed that the selector valve 8 is manipulated to connect the pressure line 7 to the load line 15 and connect the load line 16 to the return line 11. This admits fluid from the pressure line 7 to the right end of the motor cylinder 17 and permits exhaust of fluid from the left end of the cylinder, to move the piston 18 to the left. Withdrawal of fluid from the pressure line 7 reduces the pressure therein, which reduction is also created in the right end of the cylinder 35 of the unloading valve, which permits the piston means 33 to be moved back to the right by the spring 60 until the poppet 50 seats against the piston 34, after which the poppet 52 is carried clear of the passage 54. This permits exhaust of fluid from the upper end of the cylinder 30 and closing of the unloading poppet 27 so that the fluid from the pump line 3 is again delivered past the check valve 23 to the pressure line 7.

In many instances, the normal load on the piston rod 19 of the motor 17 may be relatively light, but occasional peak forces of much greater magnitude may have to be overcome. So long as the resistance to motion of the piston 18 is relatively low, the entire output of the pump 1 will flow to the motor without developing the pressure in the pressure line 7 at which the unloading valve operates. With prior systems, if the resistance encountered by the piston rod 19 was too great to be overcome by the pressure for which the loading valve 4 is normally set, then the system would be unable to move the motor piston further.

However, in accordance with the present invention it will be observed that the pressure in the load line 15 is applied through the transfer valve 20 to the load passage 21 of the unloading valve. This transfer is effected by a shuttle valve 20a in the transfer valve 20 which, in response to a pressure in the load line 15 higher than that in the load line 16, closes off load line 16 and connects the load line 15 to the load passage 21. Therefore, the full pressure that is applied to the motor 17 is also applied to the annular face 36a of the piston 36 and is in aiding relation with the force exerted on the pistons by the spring 60. Therefore a higher pressure in the pressure line 7 is now required to cause the valve 4 to unload the pump.

The extent to which the unloading pressure is increased by the present construction depends upon the ratio between the areas of the piston faces 36a and 34a. If the face 36a has a larger area than the face 34a, then the pressure force urging the piston means 33 to the right will always be greater than that urging it to the left, and the valve will never unload. Under these conditions if the resistance to movement of the motor is sufficiently great, the relief valve 23 will eventually open to relieve the pressure in the pump line.

If the area of the face 36a is made less than the area of the face 34a, then the effect of face 36a is simply to reduce the effective area of the face 34a, and thereby reduce the force on the piston means 33 resulting from pressure, as compared to the force exerted thereon by the spring 60. Thus, if, with the selector valve 8 in neutral position, the spring 60 and the area of the face 34a is so proportioned as to unload the pump at 500 p. s. i., and the area of the face 36a is made half the area of the face 34a, then with the selector valve 8 manipulated as previously described to actuate the motor 17 and a high load resistance on the motor, the valve will unload when the pressure in the pressure line and the load lines reaches a value of 1000 p. s. i.

It is to be noted that it is not essential that the check valve 23 be located within the unloading valve 4. It is old to incorporate this check valve within the unloading valve, and it is also old to use a separate check valve between the pump line 3 and the pressure line 7 external of the unloading valve. The present invention is not limited to either positioning of the check valve.

The invention is also applicable for use with single acting motors instead of double acting motors. Thus, with reference to the drawing, the system there shown could be used to cause the motor to function in single action style by omitting one of the load lines, say the load line 16, and venting the left end of the motor cylinder 17 to atmosphere. The transfer valve 20 would then be eliminated and the single load line 15 would be connected directly to the load passage 21 of the unloading valve. The selector valve 8 would then be of such type as to connect the single load line 15 to the pressure line 7 to move the motor piston 18 to the left and connect the load line 15 to the return line 11 to permit the motor piston 18 to move to the right. It is understood that single acting motors are only used where there is a load on the motor always urging it in one direction.

Although for the purpose of explaining the invention, a particular embodiment thereof has been shown and described, obvious modifications will occur to a person skilled in the art, and I do not desire to be limited to the exact details shown and described.

I claim:

1. In a hydraulic system, a pump line and a pump for delivering fluid thereto, a pressure line and a check valve for delivering fluid from the pump line to the pressure line, a load device and a load line connected thereto, a return line for returning fluid to said pump, a selector valve for selectively connecting said load line to said pressure line or to said return line, and an unloading valve comprising: a casing defining a pump passage connected to said pump line, a pressure passage connected to said pressure line, a return passage connected to said return line, and a load passage connected to said load line; piston means reciprocable in said casing and having a first face exposed to said pressure passage and urged in one direction by pressure therein; spring means urging said piston means in the other direction; means controlled by said piston means for connecting said pump passage to said return passage and thereby unloading said pump in response to predetermined movement of said piston means in said one direction by pressure acting on said first face against the force of said spring means; said piston means having a second face opposed to said first face and exposed to said load passage whereby the force of said spring means is supplemented by a force proportional to the pressure in said load line.

2. A system according to claim 1 in which said load device is a double acting motor; a second load line between said selector valve and said motor; said selector valve is adapted to connect either load line to the pressure line and the other load line to the return line; and valve means connected to both load lines and to said load passage of said unloading valve and responsive to a pressure differential between said respective load lines for communicating only the higher pressure load line with the load passage.

3. An unloading valve for use in a hydraulic system having a pump line and a pump for delivering fluid thereto, a pressure line and a check valve for delivering fluid from the pump line to the pressure line, a load device and a load line connected thereto, a return line for returning fluid to said pump, a selector valve for selectively connecting said load line to said pressure line or said return line, said unloading valve comprising: a casing defining a pump passage adapted to be connected to said pump line, a pressure passage adapted to be connected to said pressure line, a return passage adapted to be connected to said return line, and a load passage adapted to be connected to said load line; piston means reciprocable in said casing and having a first face exposed to said pressure passage and urged in one direction by pressure therein; spring means urging said piston means in the other direction; means controlled by said piston means for connecting said pump passage to said return passage and thereby unloading said pump in response to predetermined movement of said piston means in said one direction by pressure acting on said first face against the force of said spring means; said piston means having a second face exposed to said load passage, whereby the force of said spring means is supplemented by a force proportional to the pressure in said load line.

4. A valve according to claim 3 in which said casing defines a pair of spaced apart aligned cylinders interconnected by a return chamber, the outer ends of said cylinders constituting said pressure and load passages respectively; said piston means comprising a pair of pistons in said respective cylinders and rigid means for transmitting thrust between said pistons, the outer ends of said respective pistons constituting said first and second faces and said spring means comprising a spring in said return chamber interposed between said first piston and said casing.

5. A valve according to claim 4 in which said pistons have axial bores extending therethrough and said rigid thrust transmitting means comprises a sleeve having a bore of the same diameter as and aligned with said piston bores, and a stationary mandrel positioned within and slidably fitting the bores in said pistons and sleeves.

6. A valve according to claim 3 in which said second piston face is of smaller area than said first piston face.

CLINTON E. DEARDORFF.

References Cited in the file of this patent

UNITED STATES PATENTS

| Number | Name | Date |
|---|---|---|
| 2,102,865 | Vickers | Dec. 21, 1937 |